W. E. PENN.
CURD MILL.
APPLICATION FILED MAR. 8, 1912.
1,061,401.
Patented May 13, 1913.
4 SHEETS—SHEET 4.
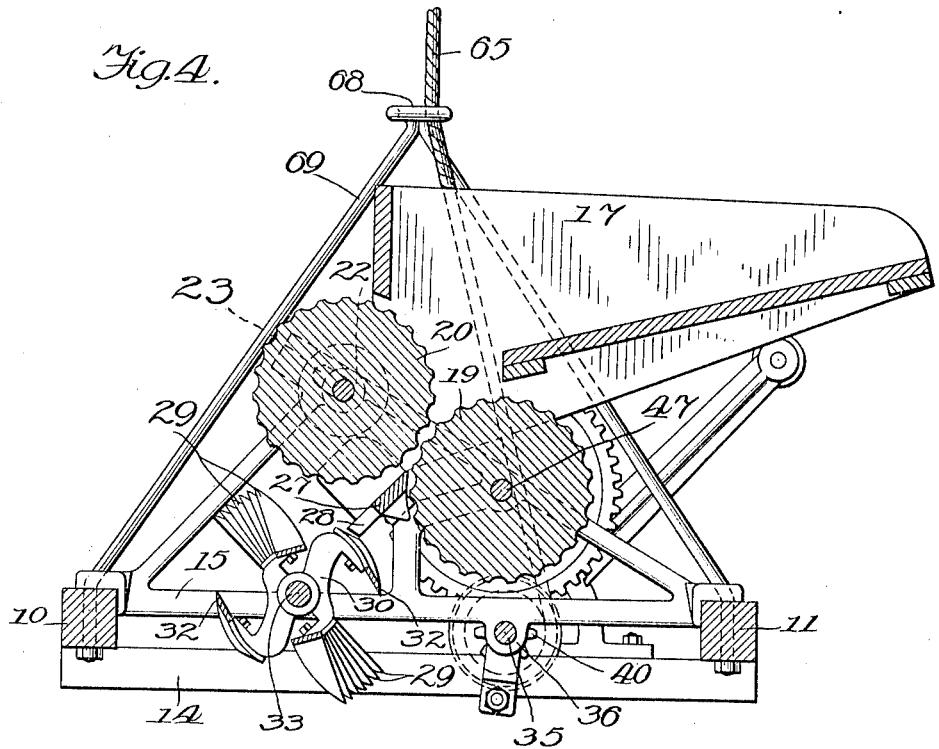
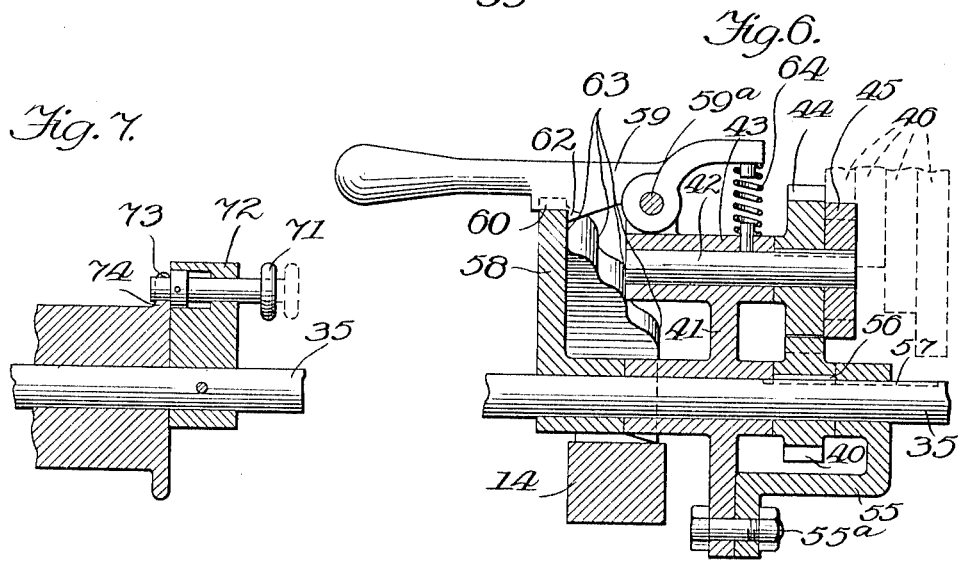
Witnesses:
J. C. Devick
E. J. Andrews
Inventor:
William E. Penn
By Luther L. Miller
Atty.

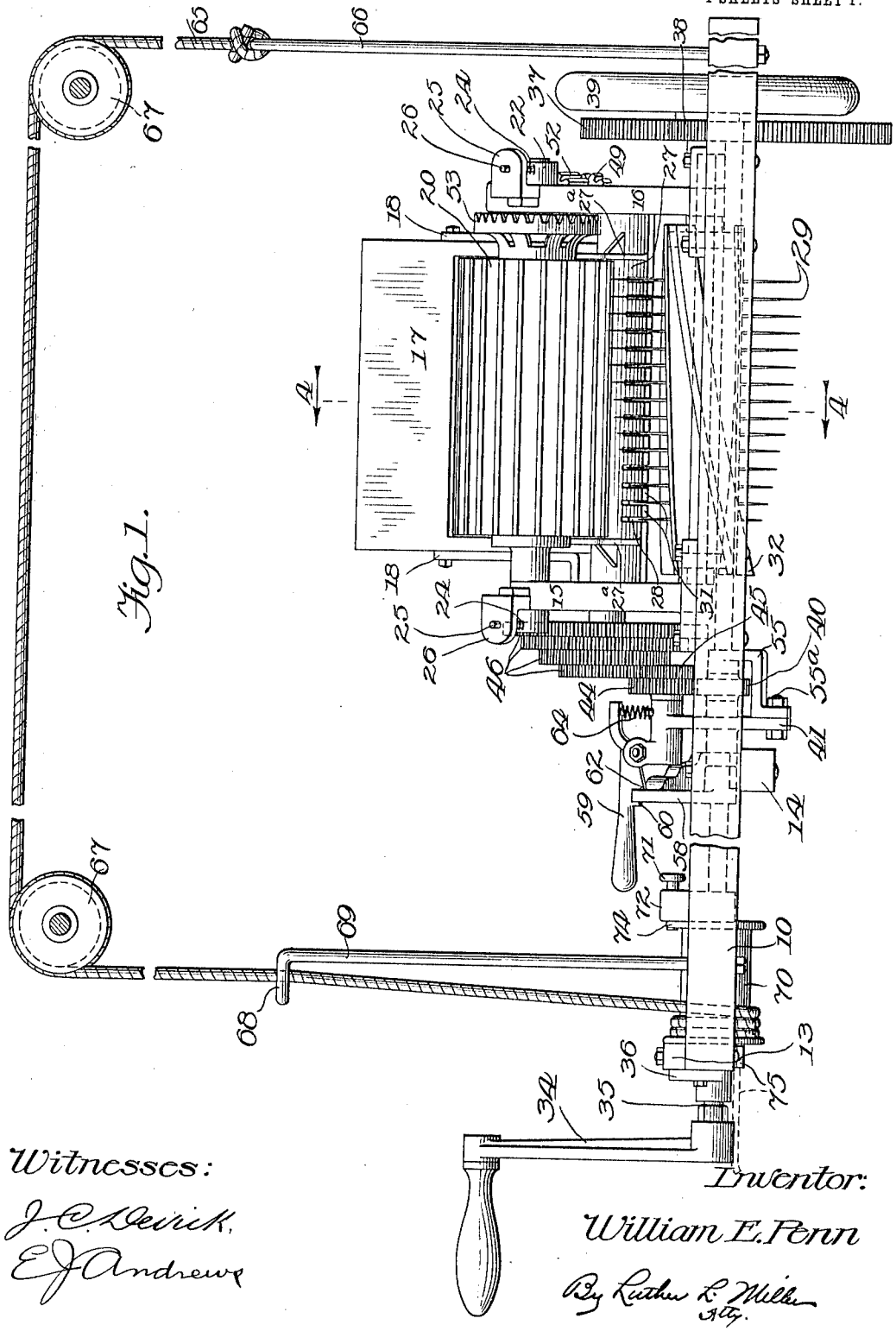

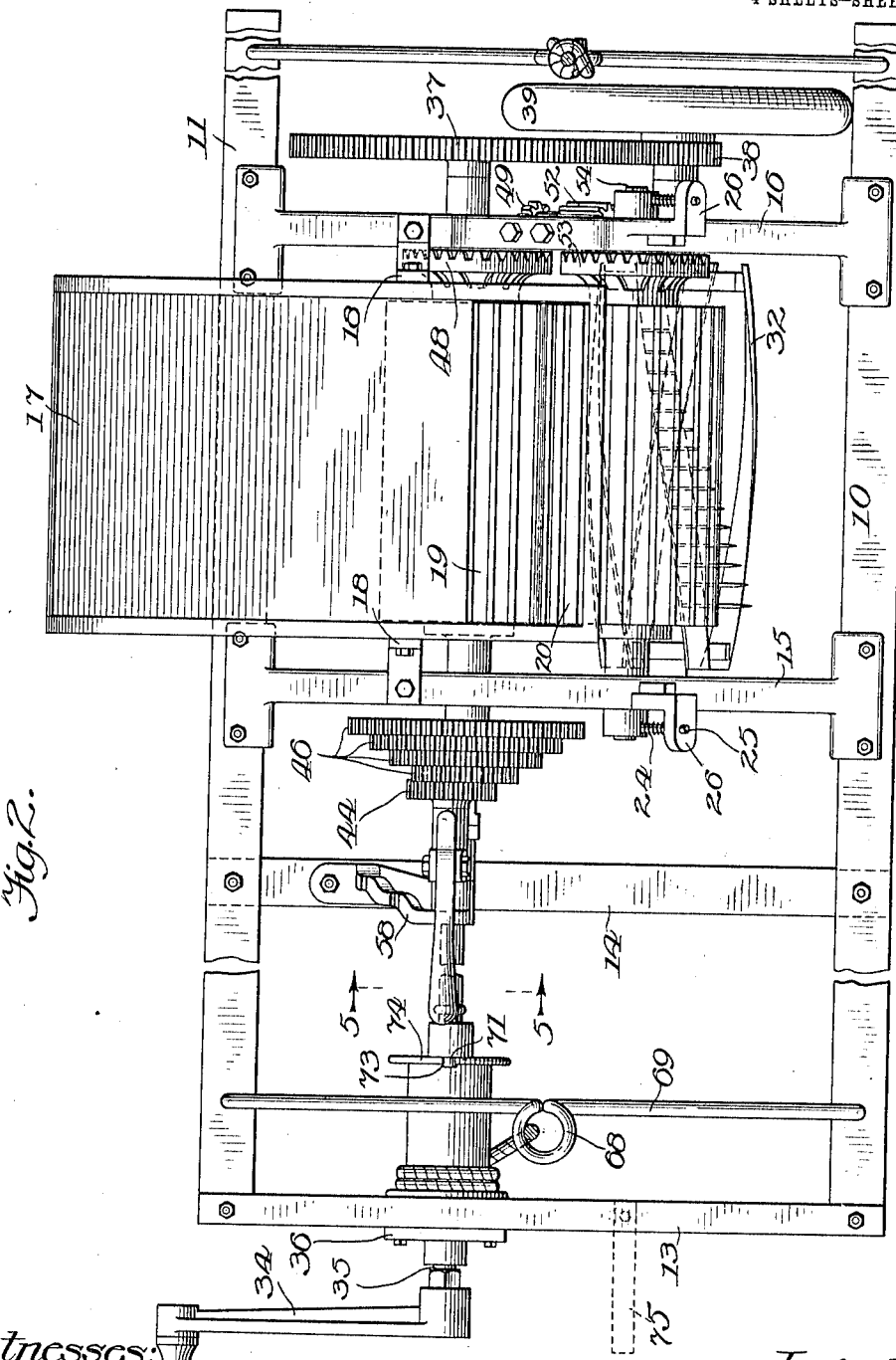

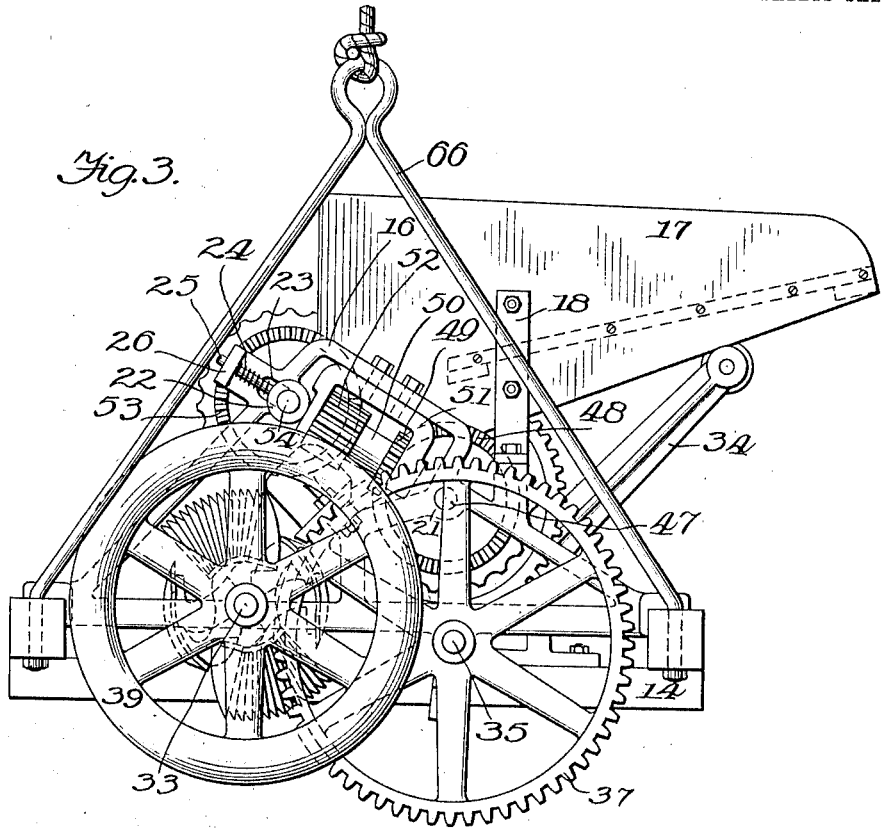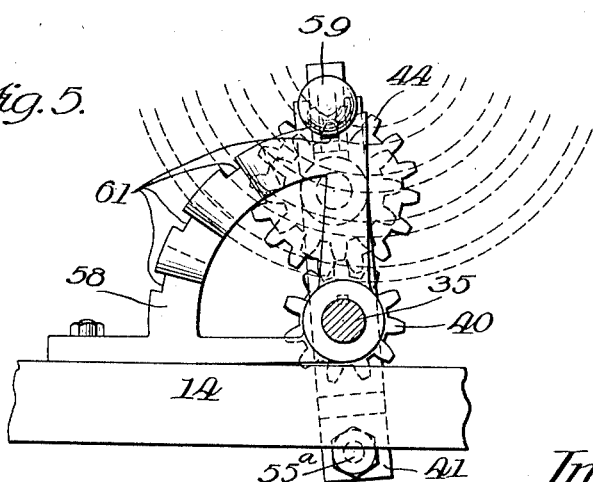

UNITED STATES PATENT OFFICE.

WILLIAM E. PENN, OF LAKE MILLS, WISCONSIN, ASSIGNOR TO CREAMERY PACKAGE MANUFACTURING COMPANY, OF CHICAGO, ILLINOIS, A CORPORATION OF ILLINOIS.

CURD-MILL.

1,061,401.

Specification of Letters Patent.

Patented May 13, 1913.

Application filed March 8, 1912. Serial No. 682,411.

*To all whom it may concern:*

Be it known that I, WILLIAM E. PENN, a citizen of the United States, residing at Lake Mills, in the county of Jefferson and State of Wisconsin, have invented certain new and useful Improvements in Curd-Mills, of which the following is a specification.

This invention relates to machines for the purpose of cutting cheese curd into small blocks as one of the steps in the cheese making process.

It has for one of its objects the production of a curd mill having a floating feed roller which automatically adapts itself to the varying thickness of the curd which may be fed to the machine.

Another object is the production of curd-cutting mechanism of such form and construction as to produce more desirable results and which require simpler operating mechanism than other machines of a similar nature.

Another object is to produce suitable mechanism for quickly changing the speed of rotation of the feed rollers with reference to that of the rotating cutting mechanism.

A further object is to produce suitable mechanism for raising the machine from the receiving vat when the milling operation is finished so that the machine will be out of the way and may be quickly lowered again when desired.

Other objects and advantages of the invention will appear as I describe hereinafter the cheese curd mill which I use as an illustration of various features of the invention.

In the accompanying drawings, Figure 1 is a rear elevation of the curd mill. Fig. 2 is a plan view of the mill. Fig. 3 is an end elevation of the machine. Fig. 4 is a vertical section along the line 4 4 of Fig. 1. Fig. 5 is a section along the line 5 5 of Fig. 2. Fig. 6 is a fragmental vertical longitudinal section of the speed-changing mechanism; and Fig. 7 is a similar section of mechanism for locking the winch which is used in raising the machine from the vat.

The purpose of the cheese curd mill is to receive the curd in a hopper, to force the curd by means of suitable feed rollers into suitable cutting mechanism; and to cut the curd up into small uniform blocks by means of said mechanism so that it may be properly processed and salted. The frame of the mill, which I show herein as an illustration, consists of the side beams 10 and 11, and the cross braces 13, 14, 15 and 16. When in use, the mill is usually supported by the vat which receives the blocks of curd as they are cut. When not in use, it has been usual to manually lift the mill from the vat and place it in some convenient portion of the building until needed. As this is an unsatisfactory method of disposing of the mill when not in operation, I have provided means for raising the mill above the vat and leaving it thus supported when not in use. Said means comprises a rope attached at one end to the mill, passing over overhead pulleys and attached at the other end to a winch mounted in the mill, as will be more fully described hereinafter.

The hopper 17, which receives the curd which is to be operated upon by the machine, is attached to the braces 15 and 16 by means of the brackets 18. The corrugated feed rollers 19 and 20 receive the curd from the hopper and force it down to the cutting mechanism. These rollers are journaled in bearings supported by the braces 15 and 16. The bearings 22 of the roller 20 are slidably mounted in slots 23 in the brace 15 so that the roller 20 will float to and from its mate, the roller 19, according to the varying thickness of the curd. The bearings of the roller 20 are forced toward the lower ends of the slots 23 by the weight of the roller and by the compression springs 24. These springs encircle the pins 25 which are slidably mounted in the lugs 26 on the braces 15 and 16. By the use of this floating feed roller, provision is made for feeding curd of varying thickness without injuriously crushing the curd as it passes through the rollers.

The curd passes from the rollers onto the stationary cutting member 27, the side boards 27ª keeping the curd from spreading. This member 27, which is supported at both ends by the braces 15 and 16, has slots 28 through which pass the splitting blades 29 of the rotating cutting member 30, these blades cutting the curd into longitudinal strips. The member 27 also has cutting edges 31 which coact with the rotating transverse cutting blades 32 and cut the strips into blocks. The rotating cutting member 30 is mounted on the shaft 33, and it comprises in this instance, four arms substantially 90° apart, said arms carrying the splitting blades 29 and the cutting blades 32.

The splitting blades comprise two sets of blades positioned substantially diametrically opposite each other, the individual members of the sets being placed at a slight angle to each other, as indicated, so as to distribute the cutting of the curd more uniformly throughout the rotation of the member. The transverse cutting blades 32 are also substantially diametrically opposite each other, and are inclined to the axis of the shaft 33 so as to still more completely distribute the cutting of the curd throughout the rotation of the member. The blocks of curd as they are cut drop into the vat below the mill.

The machine may be operated in any suitable manner. I have used in this instance a hand crank 34 fixed to one end of the drive shaft 35. The bearings 36 of this shaft are carried by the cross braces of the frame of the machine. Mounted on the other end of the drive shaft is a gear wheel 37 which meshes with the pinion 38 fixed on the shaft 33. By this means the shaft 33 and hence the rotary cutting member are operated. A fly wheel 39 fixed to the shaft 33 assists in keeping uniform the rotation of the cutter.

Slidably mounted on the shaft 35 is a pinion 40 by means of which the feed rollers are operated. A bracket 41 rotatably mounted on the shaft 35 supports a shaft 42 in the bearing 43. Fixed to the shaft 42 is a pinion 44 which is in constant mesh with the pinion 40. Also fixed to the shaft 42 is a pinion 45 which is adapted to mesh with any one of the gear wheels 46, as may be desired, thus forming a speed-change mechanism. The means for shifting the pinion 45 to the different gears 46 will be described hereinafter.

Each of the gears 46 is fixed to the shaft 47 upon which is mounted the feed roller 19. Also fixed to this shaft is the crown gear 48. Meshing in this gear is the pinion 49 fixed to the shaft 50. The shaft 50 is journaled in the U-shape bracket 51 attached to the brace 16. Also fixed to the shaft 50 is the elongated pinion 52 which meshes with the crown gear 53, which is fixed to the floating shaft 54 upon which is mounted the roller 20. By means of these gears, it will be seen that the rotation of the shaft 35 will cause rotation of the shafts 47 and 54, and hence of the feed rollers 19 and 20, which are respectively mounted on these shafts. As the bearings of the float roller 20 play in the slots 23, the elongated pinion 52 is constantly in mesh with the crown gear 53.

In order to vary the size of the blocks of curd which are cut by the machine, and for other reasons, it is desirable to vary the speed of the feed rollers with reference to the speed of the rotating cutting member. For this purpose I have produced the speed-change gear mechanism hereinbefore mentioned. It is evident that the relative speed of the rollers are dependent upon the particular gear 46 with which the pinion 45 meshes. The mechanism by which this pinion is caused to mesh with any one of the gears 46 will now be described. The member 55 is slidably and rotatably mounted on the shaft 35, and is attached to the bracket 41 by the bolt 55$^a$, or by any other suitable means. The pinion 40 is thus held against the bracket 41. The pinions 44 and 45 are also secured to the bracket 41 by means of the shaft 42. So that the bracket 41, which is slidably and rotatably mounted on the shaft 35, carries with it the pinions 40, 44 and 45 to whatever position it may be moved on the shaft. The feather 56, playing in the slot 57 in the shaft, prevents the pinion 40 from rotating relatively to the shaft. Hence, by sliding the bracket along the shaft 35, and rotating it on the shaft so much as may be necessary, the pinion 45 may be caused to mesh with any one of the gears 46 as may be desired.

In order to hold the bracket in position when the gears are properly meshing, I have provided a cam bracket 58 which is fixed to the brace 14. A lever 59, pivoted at the point 59$^a$ to the bracket 41, has a projection 60 which may be placed in any one of the notches 61 of the cam bracket. The lever also has a shoulder 62 which may be placed against any one of the shoulders 63 formed by the cam surface. Each of the cam notches corresponds angularly, and each of the cam shoulders corresponds longitudinally, with the proper position for the pinion 45 to mesh with one of the gears 46. So that the pinion may be caused to mesh with any one of the gears desired by placing the projection 60 in the corresponding notch 61 and the shoulder 62 against the corresponding shoulder 63 of the cam. A spring 64 tends to hold the projection in its proper notch.

In order to avoid manually lifting the machine from the vat when the milling is finished, I have produced mechanism by which the machine, when not in use, may be quickly raised above the vat, and when again to be used, may be quickly lowered. This mechanism comprises the rope 65 attached at one end to one end of the machine in any suitable manner. In this instance I use the V-shape rod 66, the ends of which are attached to the corners of the end of the machine, as shown in Fig. 3, and to the apex of which I attach the rope. The rope then passes over the pulleys 67 mounted above the machine, making a full turn on one or both of the pulleys. It then passes through the eye 68 in the rod 69 which may be attached to the machine in a manner similar to that of the rod 66. The end of the rope is then attached to the winch 70, which is mounted on the driving shaft 35. Normally the winch is free to rotate on the shaft, but when it is desired to raise the mill, the pin 71 may be used to prevent rotation of the winch with relation to the shaft. This pin is slidably mounted in the arm 72, which is fixed to the shaft. As the arm is rotated with reference to the winch, the pin will register with a slot 73 in the flange 74 of the winch, and the winch may be kept from relative rotation by pushing the pin in the slot. The winch may then be rotated and the rope wound thereon by means of the operating crank 34. As the machine rises the operator, by bearing down on the crank end of the machine, may easily keep the machine from tipping. When raised to a desired height, the shaft may be kept from rotating when the handle is released, by means of a stop 75, pivoted to the cross piece 13 and movable into the path of the crank. It will thus be seen that, by the use of this mechanism, the machine may be quickly raised by one person out of the way of other operations, and may be readily lowered when desired.

I wish it to be understood that I do not confine myself to the details of the mechanism herein set forth, as various modifications may be made by those skilled in the art without departing from the spirit of my invention, as set forth in the following claims.

I claim as my invention:

1. A curd mill comprising a framework, a hopper, corrugated feed rollers, cutting mechanism, means for operating said rollers and mechanism, and bearings supporting said rollers, one pair of said bearings being slidably mounted in said framework, the axes of said rollers lying in an inclined plane.

2. A curd mill comprising a framework, corrugated feed rollers, cutting mechanism, means for operating said rollers and mechanism, bearings supporting said rollers, one pair of said bearings being slidably mounted in said framework, and yieldable means pressing said slidable bearings toward the other pair of bearings, the axes of said rollers lying in an inclined plane.

3. In a curd mill, cutting mechanism comprising a fixed member and a rotary member, said fixed member having longitudinal slots therein and transverse cutting edges thereon, said rotary member having a shaft with a plurality of splitting knives and a plurality of transverse cutting knives mounted on said shaft; and means for rotating said shaft.

4. In a curd mill, cutting mechanism comprising a fixed member and a rotary member, said fixed member having longitudinal slots therein, and said fixed member having transverse cutting edges thereon, said rotary member comprising a shaft, a plurality of splitting knives and a plurality of transverse cutting knives mounted on said shaft; means for rotating said shaft, each of said splitting knives in its rotation passing through one of said slots.

5. In a curd mill, cutting mechanism comprising a shaft, a plurality of splitting knives and two transverse cutting knives mounted on said shaft, and means for operating said shaft; said splitting knives comprising two sets, said sets positioned substantially diametrically opposite each other, and the individual knives in each set spaced angularly with reference to each other; said cutting knives positioned substantially diametrically opposite each other, and at substantially 90° from the central portion of said sets.

6. A curd mill comprising a framework, feed rollers, and cutting mechanism, said mechanism comprising a shaft supported by said framework, a member having a plurality of arms mounted on said shaft, cutting knives fixed to some of said arms, and splitting knives fixed to the other arms, and means to rotate said shaft.

7. A curd mill comprising a framework, a hopper, cutting mechanism, and two feed rollers, said hopper being located above said rollers and slanting upward away therefrom, the axes of said rollers lying in an inclined plane, and an inclined member between said rollers and said cutting mechanism.

In testimony whereof I affix my signature in presence of two witnesses.

WILLIAM E. PENN.

Witnesses:
E. C. Brown,
O. B. Coombe.

Copies of this patent may be obtained for five cents each, by addressing the "Commissioner of Patents, Washington, D. C."